(12) United States Patent
Chen

(10) Patent No.: US 7,186,117 B2
(45) Date of Patent: Mar. 6, 2007

(54) CONNECTION MECHANISM FOR BATTERY PACK AND POWER TOOLS

(75) Inventor: Hsin-Chi Chen, Taiping (TW)

(73) Assignee: Tranmax Machinery Co., Ltd., Taichung Hsien (TW)

( * ) Notice: Subject to any disclaimer, the term of this patent is extended or adjusted under 35 U.S.C. 154(b) by 92 days.

(21) Appl. No.: 11/102,670

(22) Filed: Apr. 11, 2005

(65) Prior Publication Data

US 2006/0228936 A1   Oct. 12, 2006

(51) Int. Cl.
*H01R 39/00* (2006.01)

(52) U.S. Cl. ............... 439/11; 320/107; 320/114; 320/115; 310/47; 310/50; 173/217; 439/577; 429/96

(58) Field of Classification Search ............... 439/11, 439/577, 501, 162, 164; 320/107, 114, 115; 310/47, 50; 173/217; 429/96–100
See application file for complete search history.

(56) References Cited

U.S. PATENT DOCUMENTS

| 4,751,452 | A  | * | 6/1988  | Kilmer et al. ............... 320/106 |
| 6,729,415 | B1 | * | 5/2004  | Huang ........................... 173/217 |
| 7,121,362 | B2 | * | 10/2006 | Hsu et al. ..................... 173/217 |
| 2006/0113100 | A1 | * | 6/2006 | Hsu et al. ..................... 173/217 |

* cited by examiner

*Primary Examiner*—Gary F. Paumen
(74) *Attorney, Agent, or Firm*—Troxell Law Office, PLLC

(57) ABSTRACT

A battery-powered tool includes a barrel and a handle connected to the barrel. A battery pack has a body and a pivotal tube extending from a top of the battery pack. The pivotal tube is inserted in a space defined axially in the handle so as to provide electric power to the tool. The pivotal tube can be pivoted between a first position and a second position relative to the handle. A limitation portion is located between the pivotal tube and an inner periphery of the space so as to limit a movement of the pivotal tube in the handle along an axial direction. An angle restriction portion is located between the pivotal tube and an inner periphery of the space so as to restrict the body to be rotated an angle less than 360 degrees between the first and second positions.

15 Claims, 18 Drawing Sheets

US 7,186,117 B2

1

CONNECTION MECHANISM FOR BATTERY PACK AND POWER TOOLS

FIELD OF THE INVENTION

The present invention relates to a battery-powered tool wherein the battery pack can be pivoted between two positions relative to the handle of the tool so as to meet requirements of use in narrow space.

BACKGROUND OF THE INVENTION

A conventional battery-powered tool such as electric drill generally includes a barrel and a handle which includes a connection portion for being connected with a battery pack which provide electric power to drive the drill. In order to provide sufficient battery power, the battery pack generally made in a cubic pack which occupies a certain space and protrudes from a front side of the handle. Besides, the extension line of the center of weight of the whole tool is located within the bottom of the battery pack such that the tool is conveniently handled.

Therefore, when working in a narrow space, the bulky battery pack could not be so convenient to move within the narrow space. Even worse, the battery pack limits the tool to reach objects in a deep area and the users have to change another tool to finish the job. In this situation, the bulky battery pack limits the range of use of the battery-powered tools and needs to be improved.

The present invention intends to provide a connection mechanism for pivotally connecting the battery pack and the tool wherein the battery pack can be pivoted relative to the handle of the tool so as to meet special situations in a narrow space.

SUMMARY OF THE INVENTION

The present invention relates to a battery-powered tool that comprises a barrel and a handle, and a space is defined axially in the handle so as to receive a pivotal tube of a battery pack which provides electric power to the tool. A limitation portion is located between the pivotal tube and an inner periphery of the space so as to limit a movement of the pivotal tube in the handle along an axial direction. An angle restriction portion is located between the pivotal tube and an inner periphery of the space so as to restrict the body to be rotated an angle less than 360 degrees between the first and second positions.

The present invention will become more obvious from the following description when taken in connection with the accompanying drawings which show, for purposes of illustration only, a preferred embodiment in accordance with the present invention.

2

Figure 1:
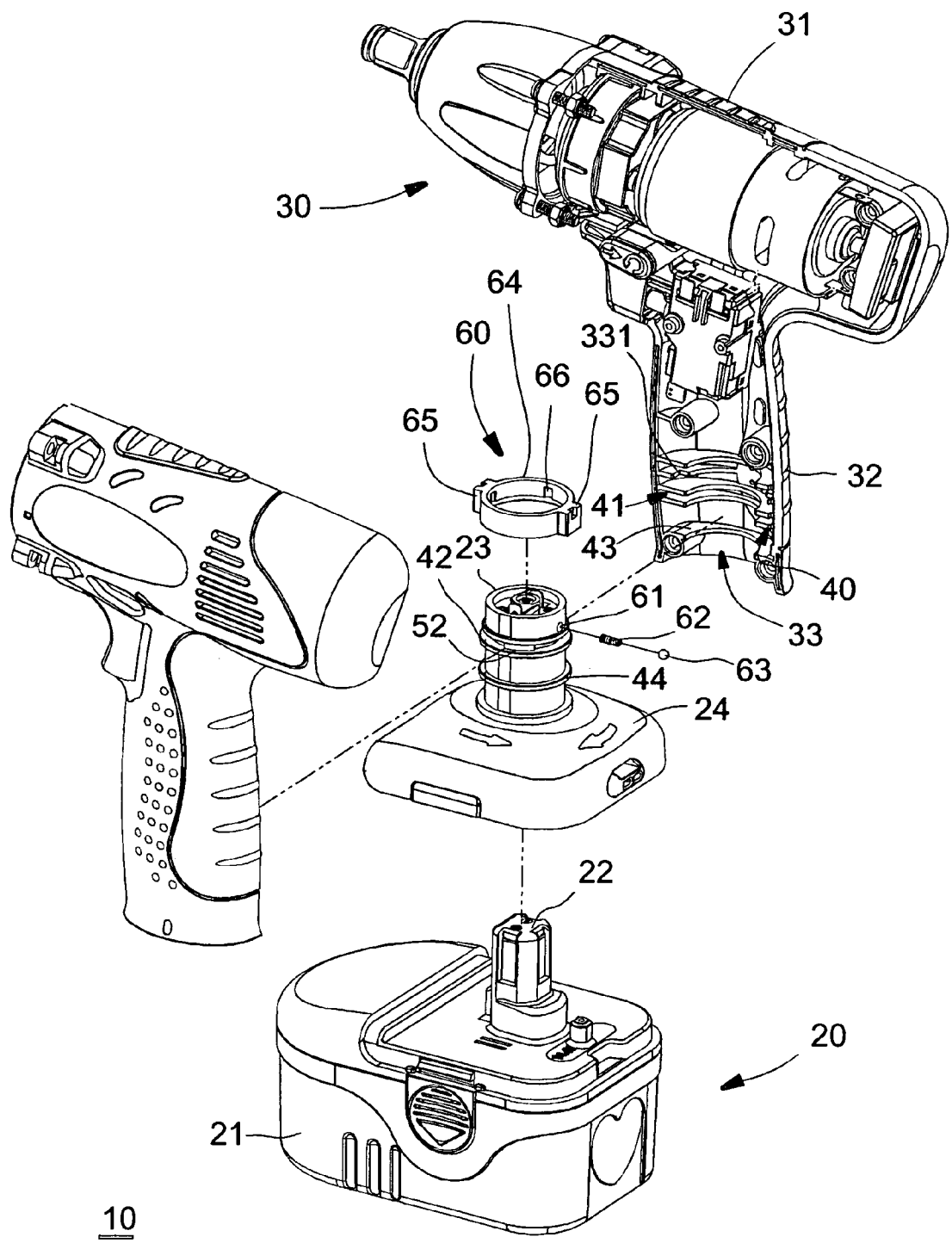
FIG. 1 is an exploded view to show a first embodiment of the present invention.
Figure 2:
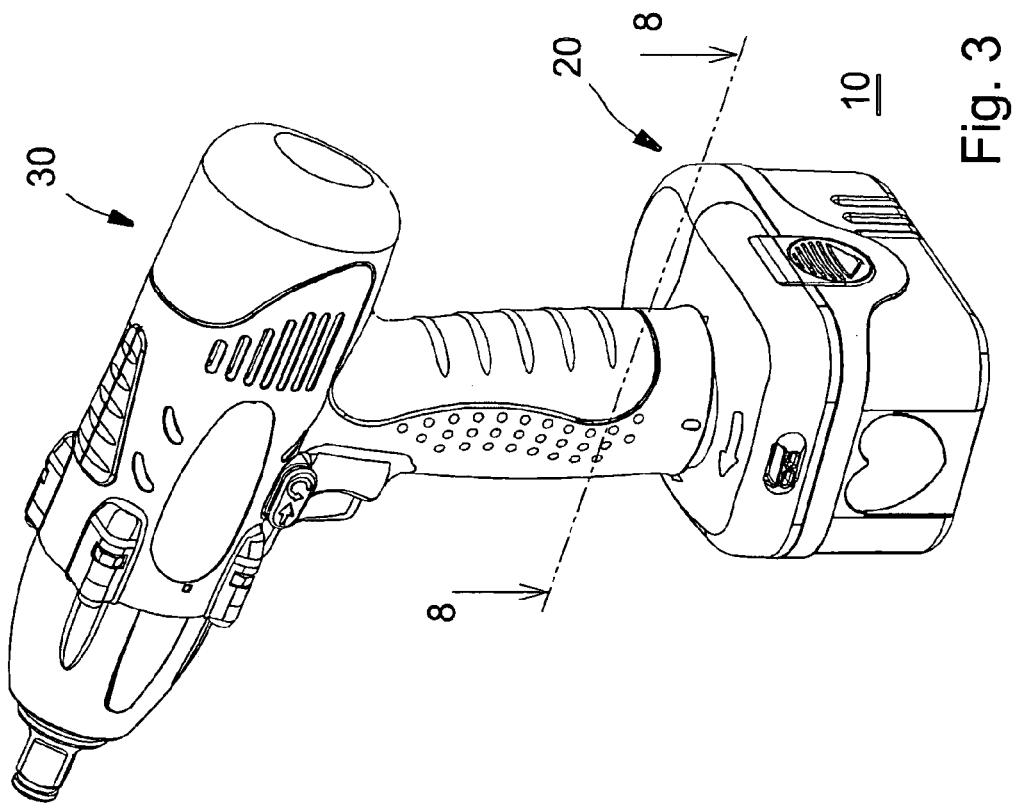
FIG. 2 shows that the battery pack of the first embodiment is positioned at the first position.
Figure 6:
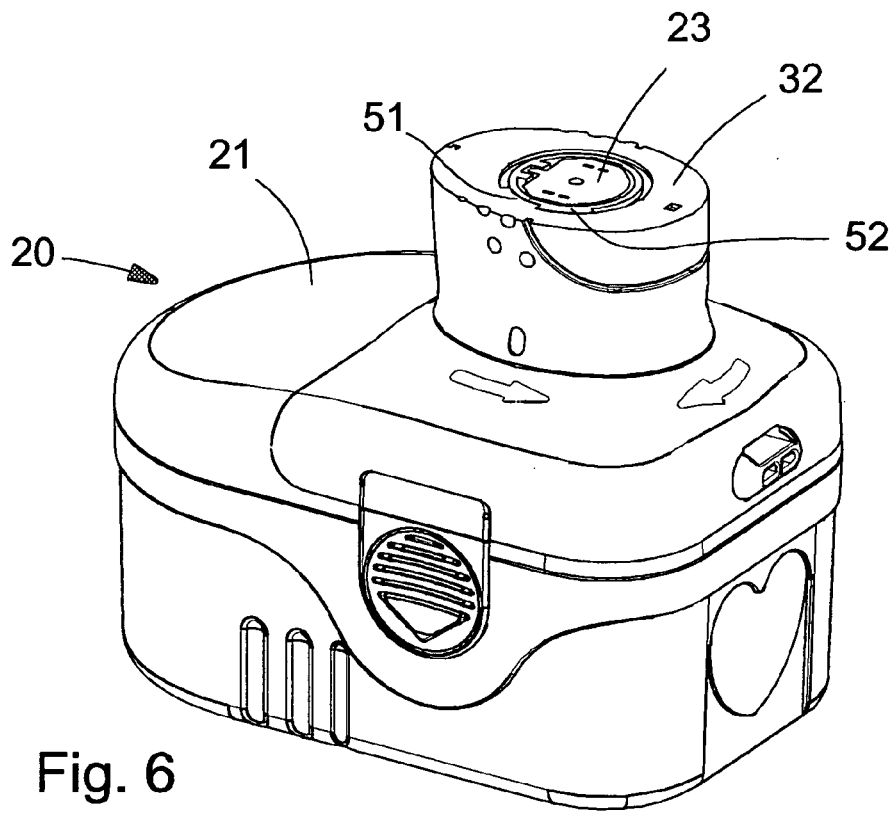
Figure 7:
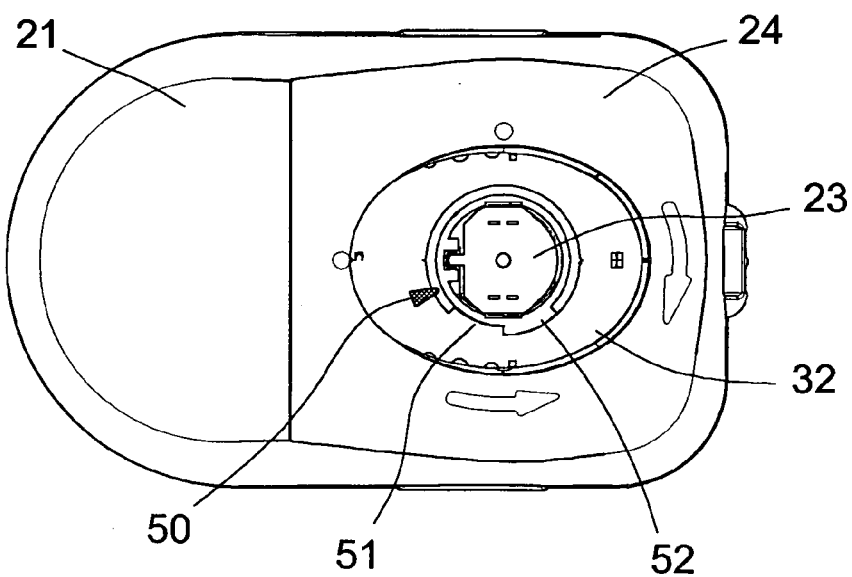
Figure 8:
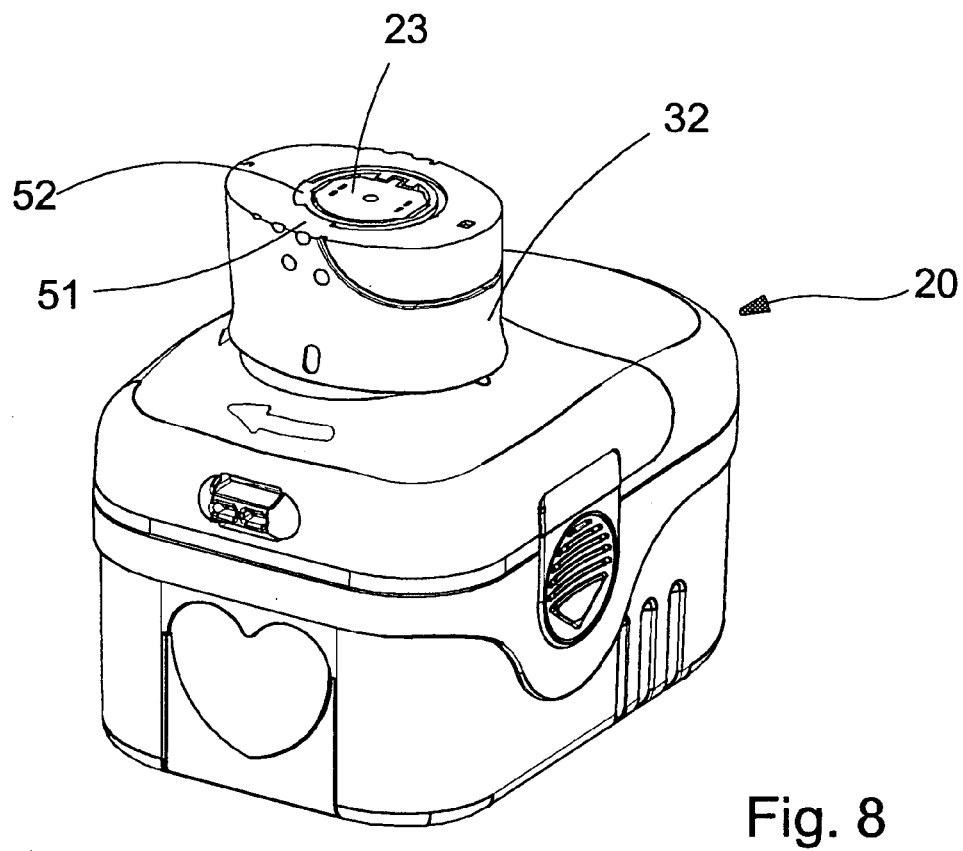
Figure 9:
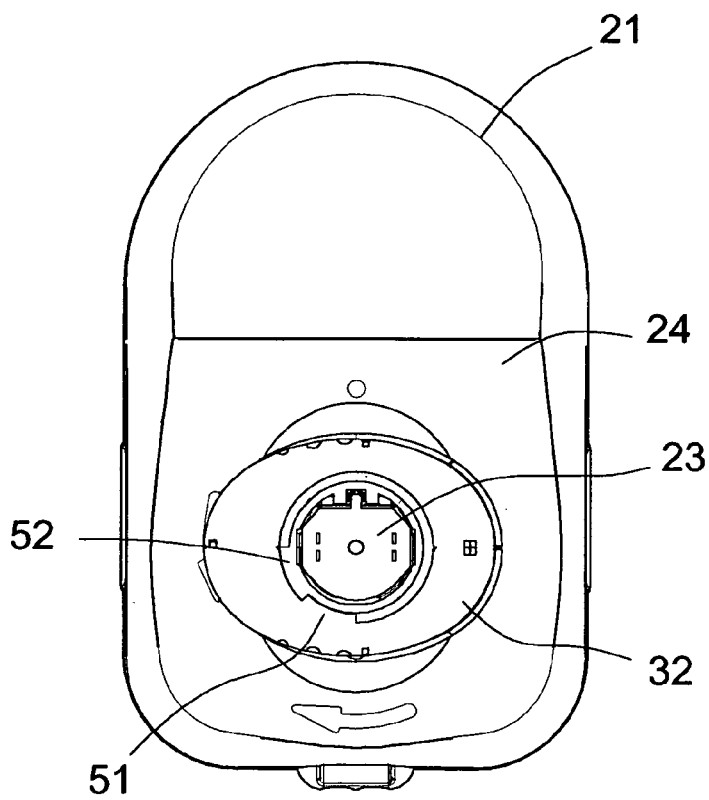
Figure 12:
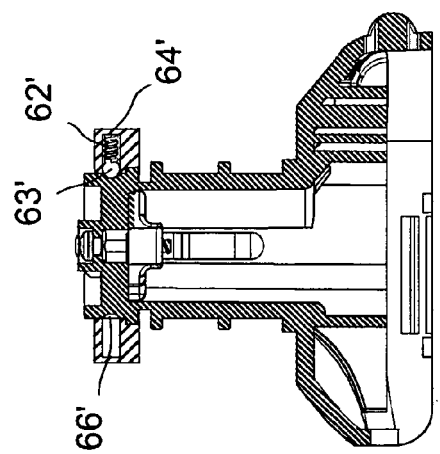
Figure 11:
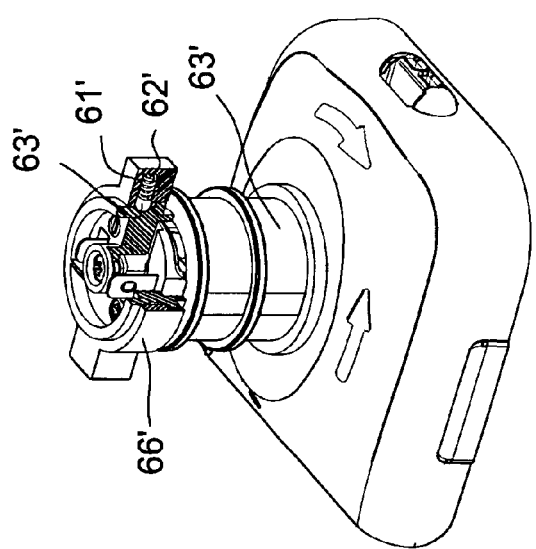
Figure 10:
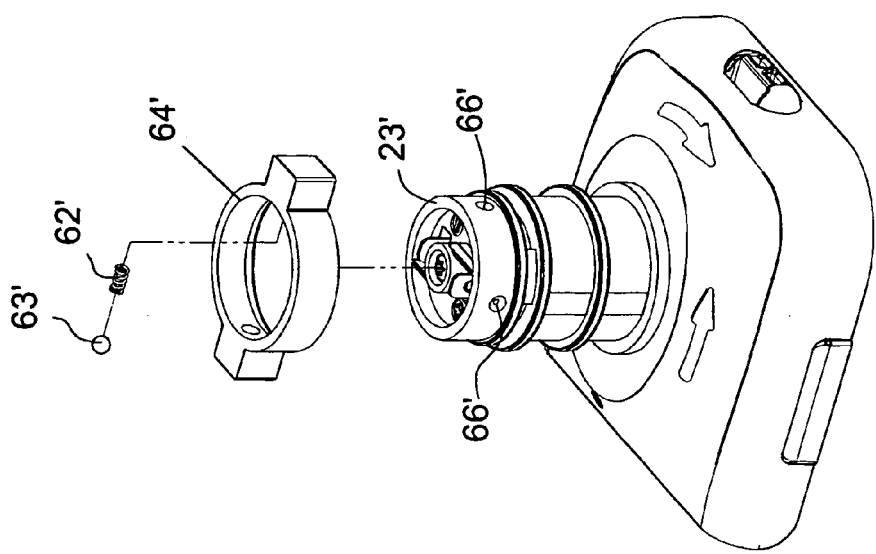
Figure 13:
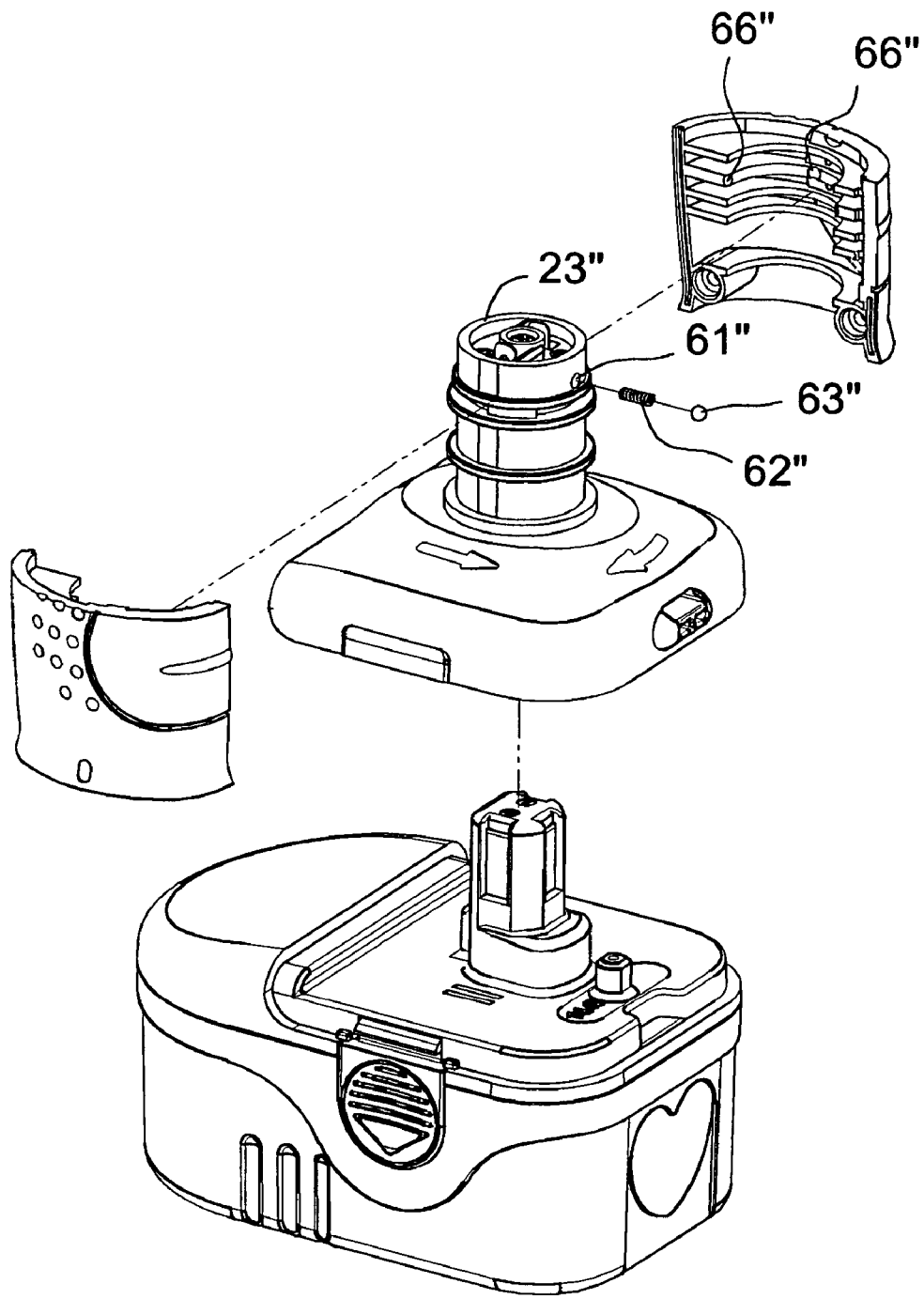
Figure 14:
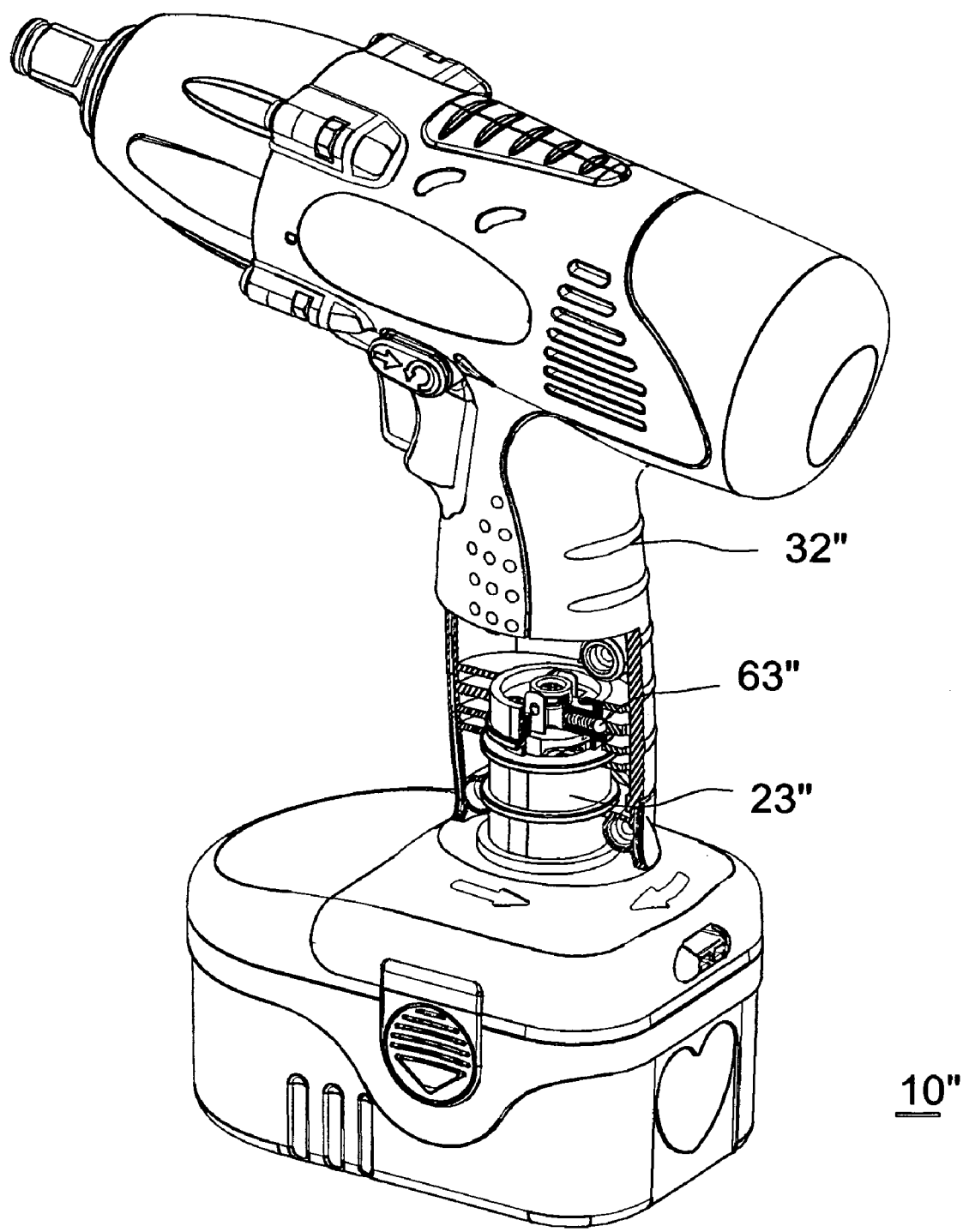
Figure 15:
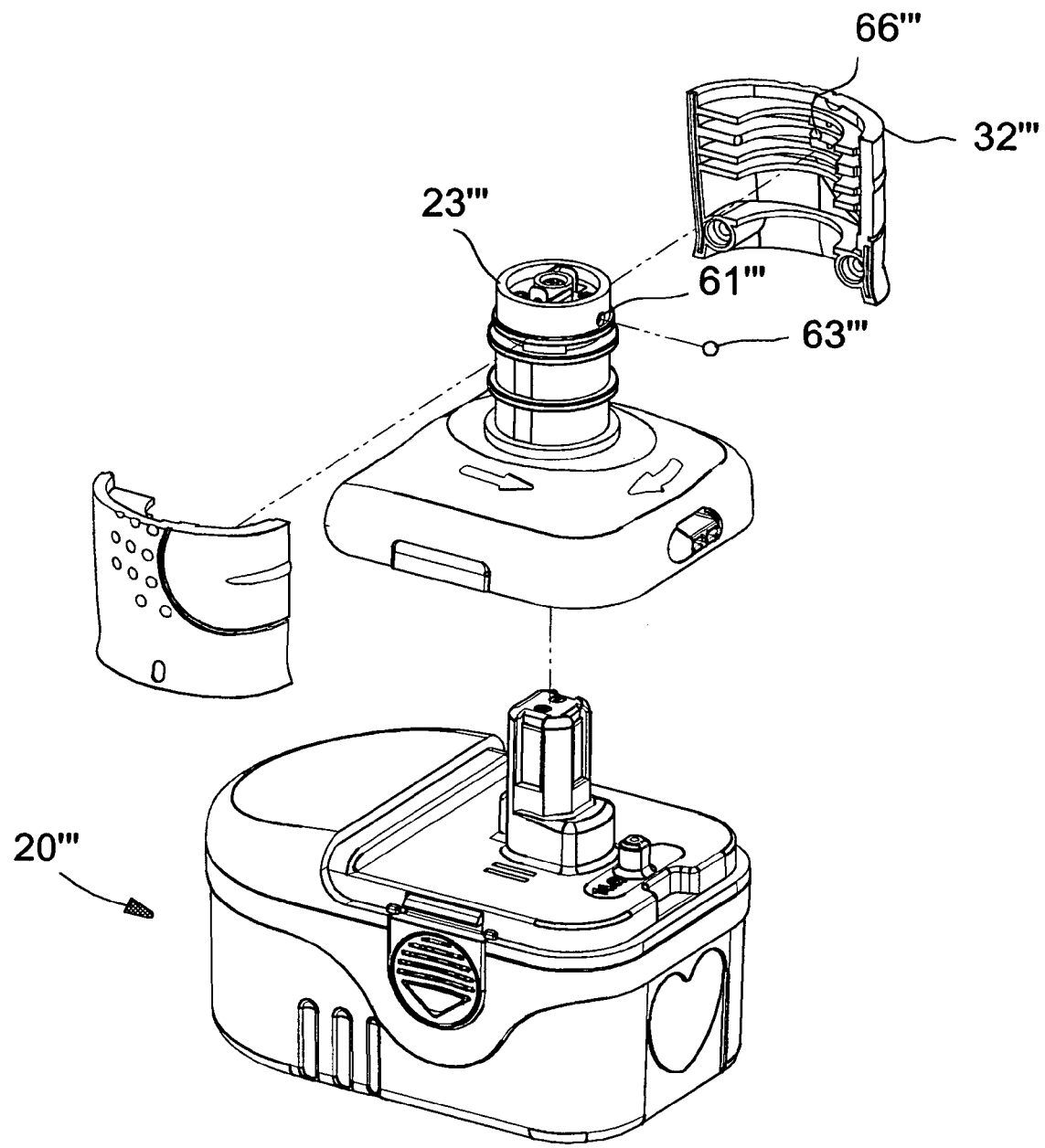
Figure 16:
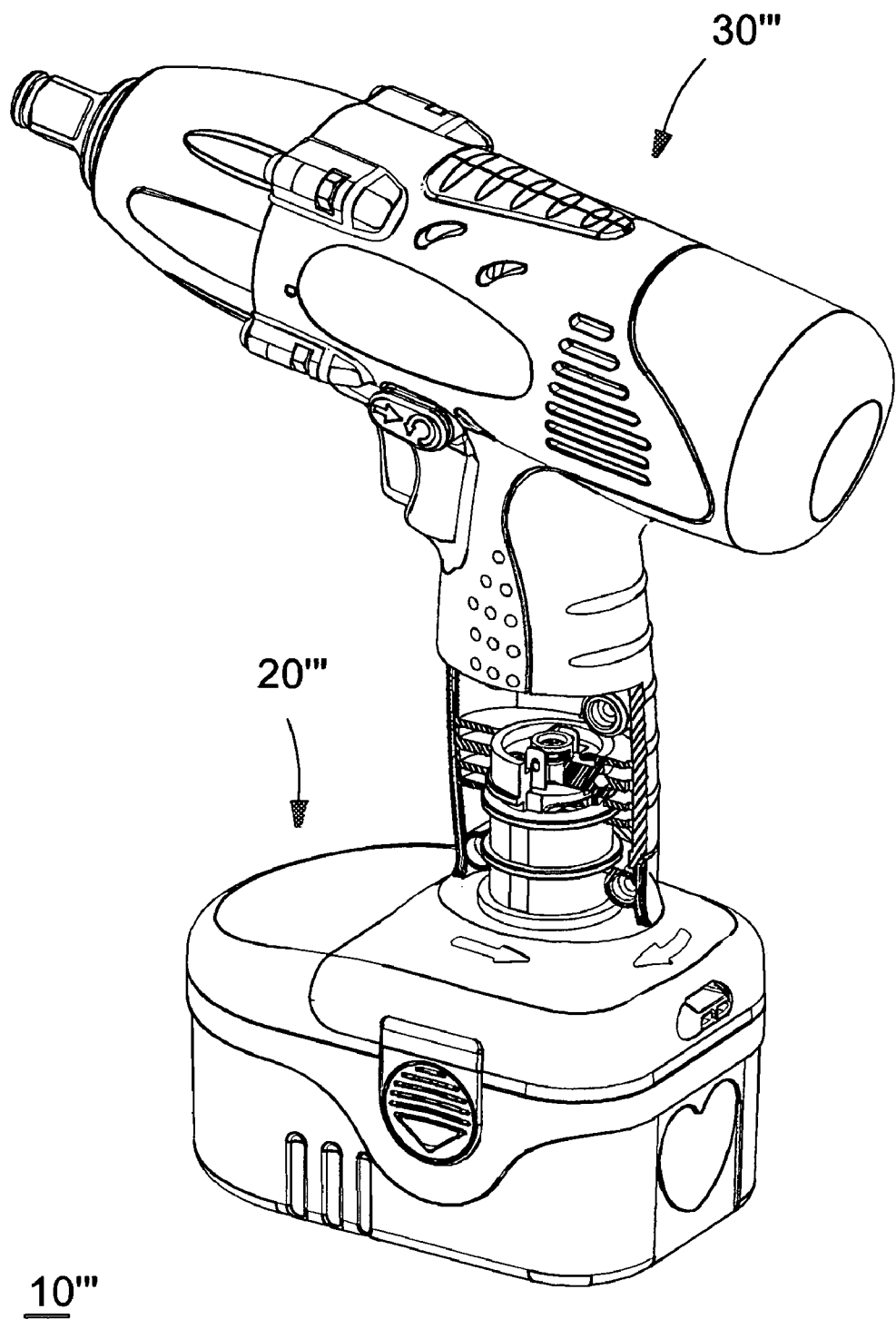
Figure 17:
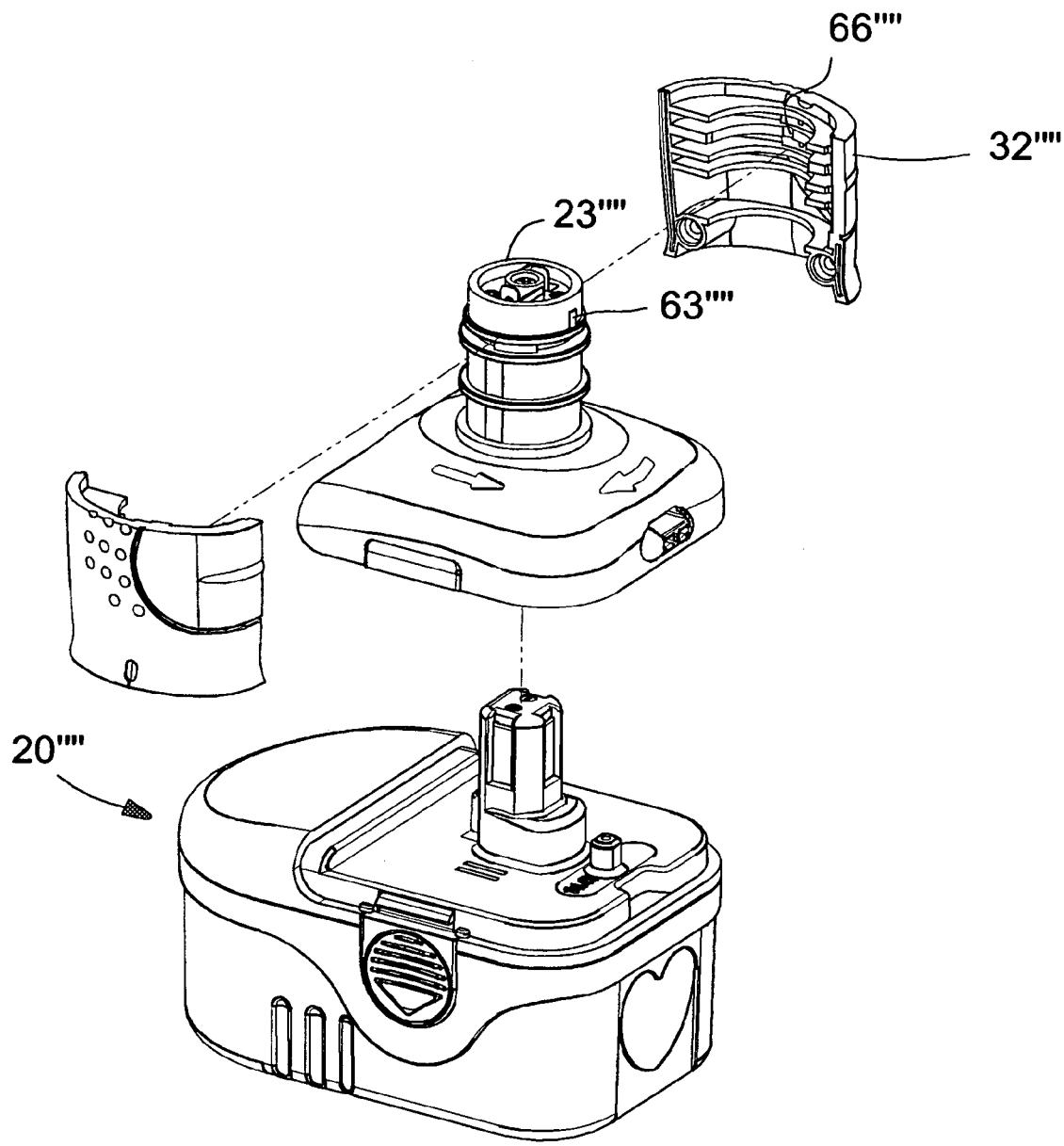
Figure 18:
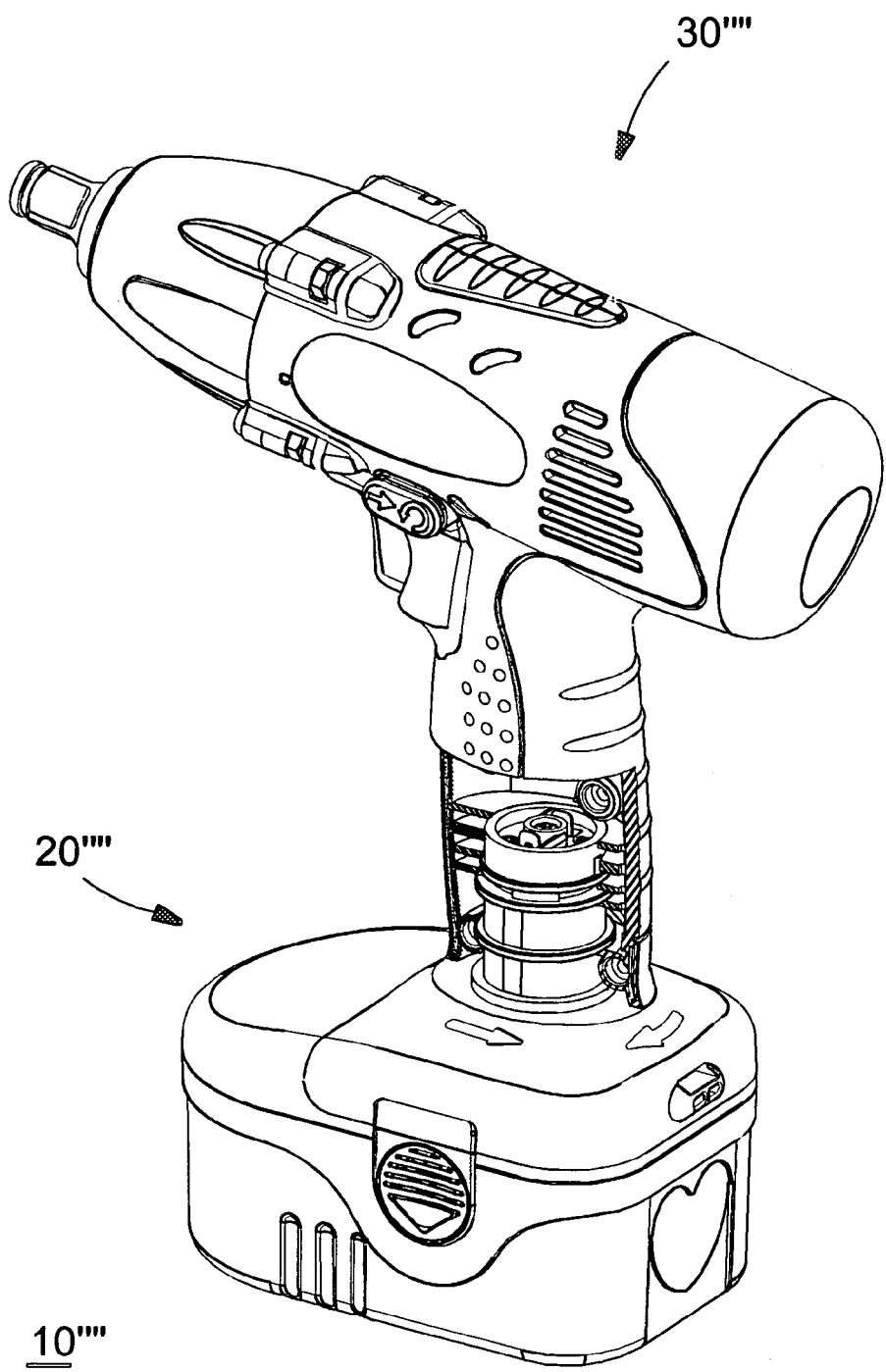
Figure 19:
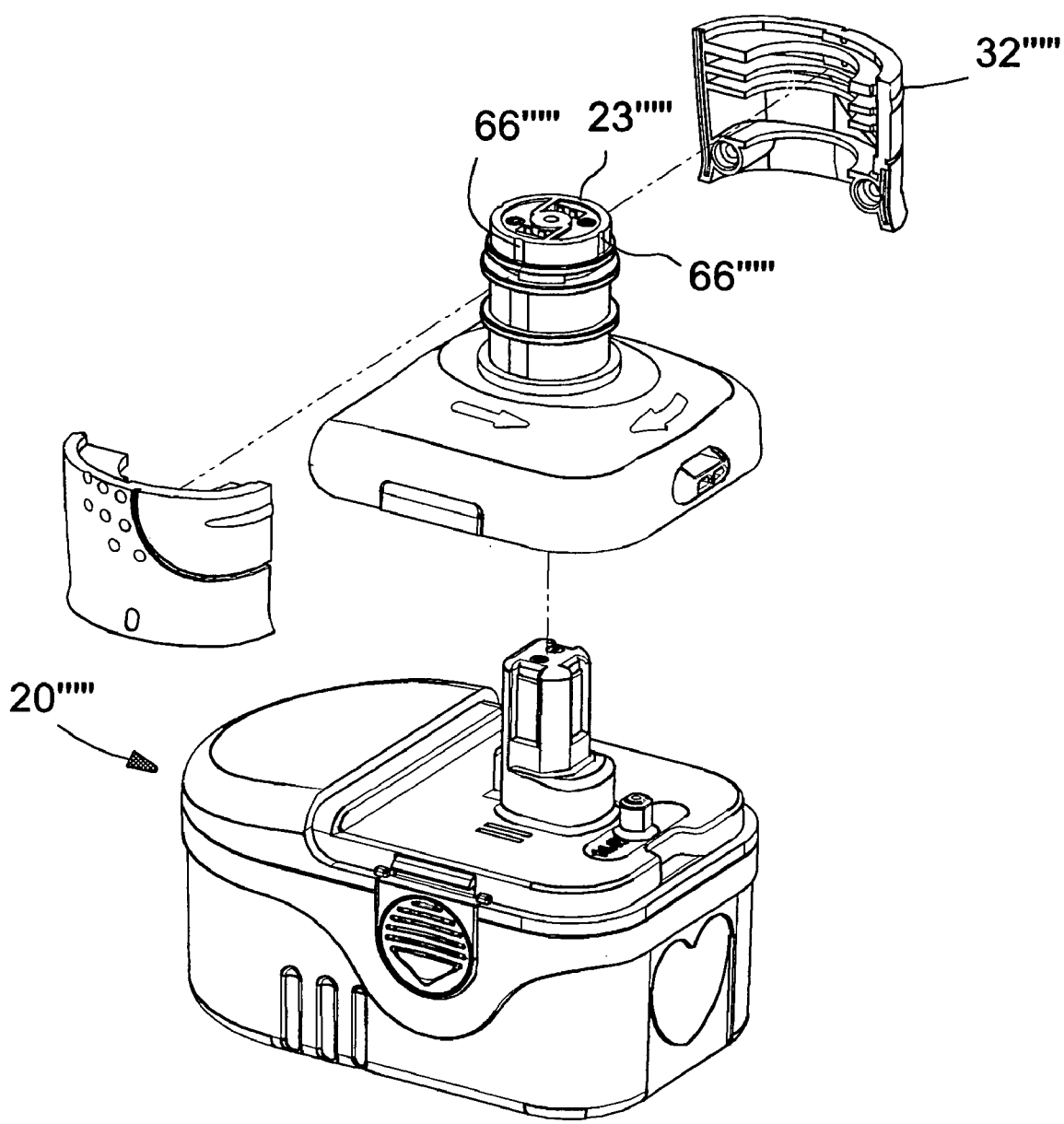
Figure 20:
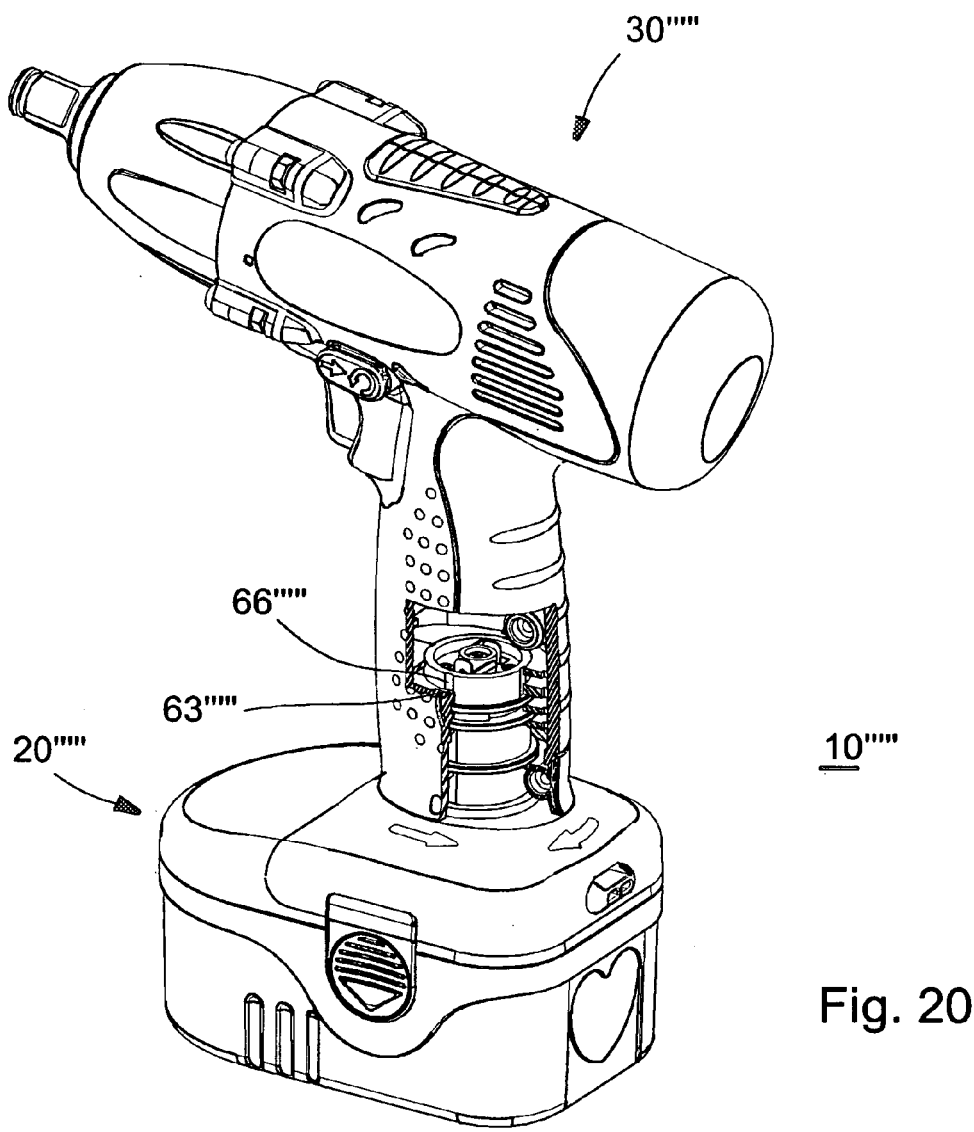
Figure 21:
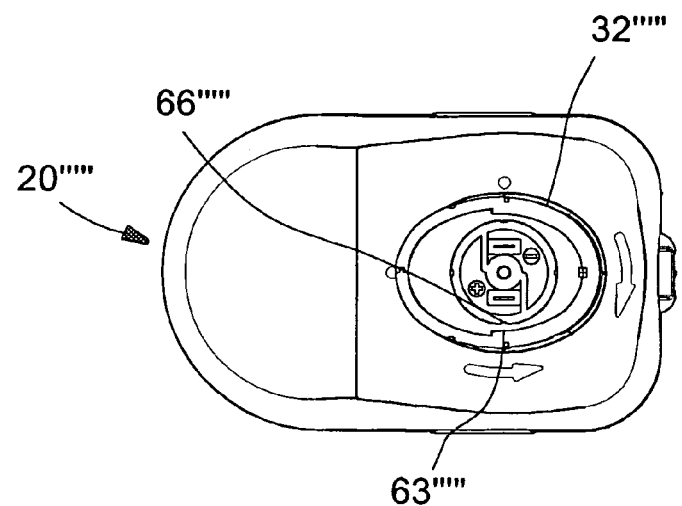
Figure 22:
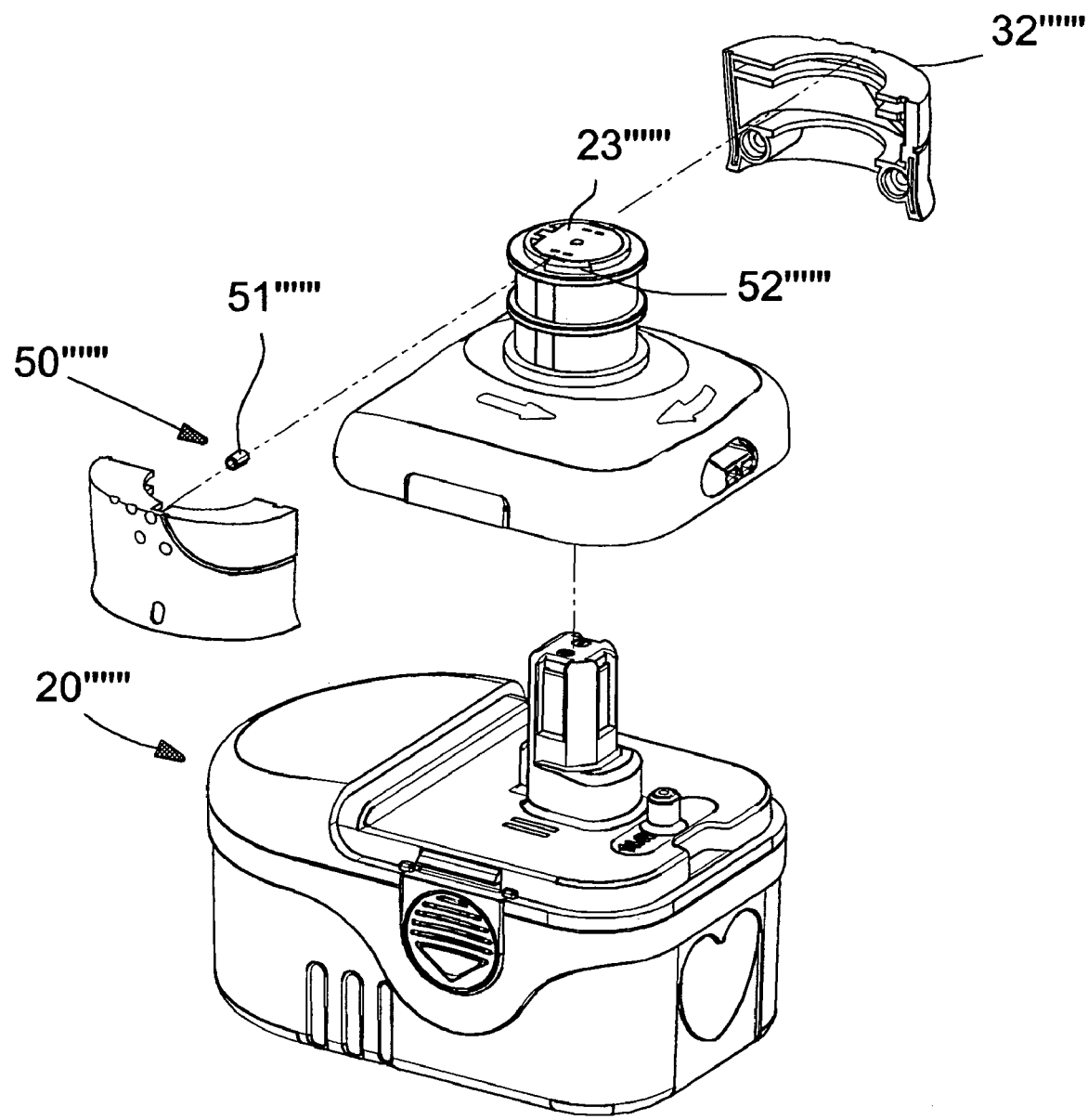
Figure 23:
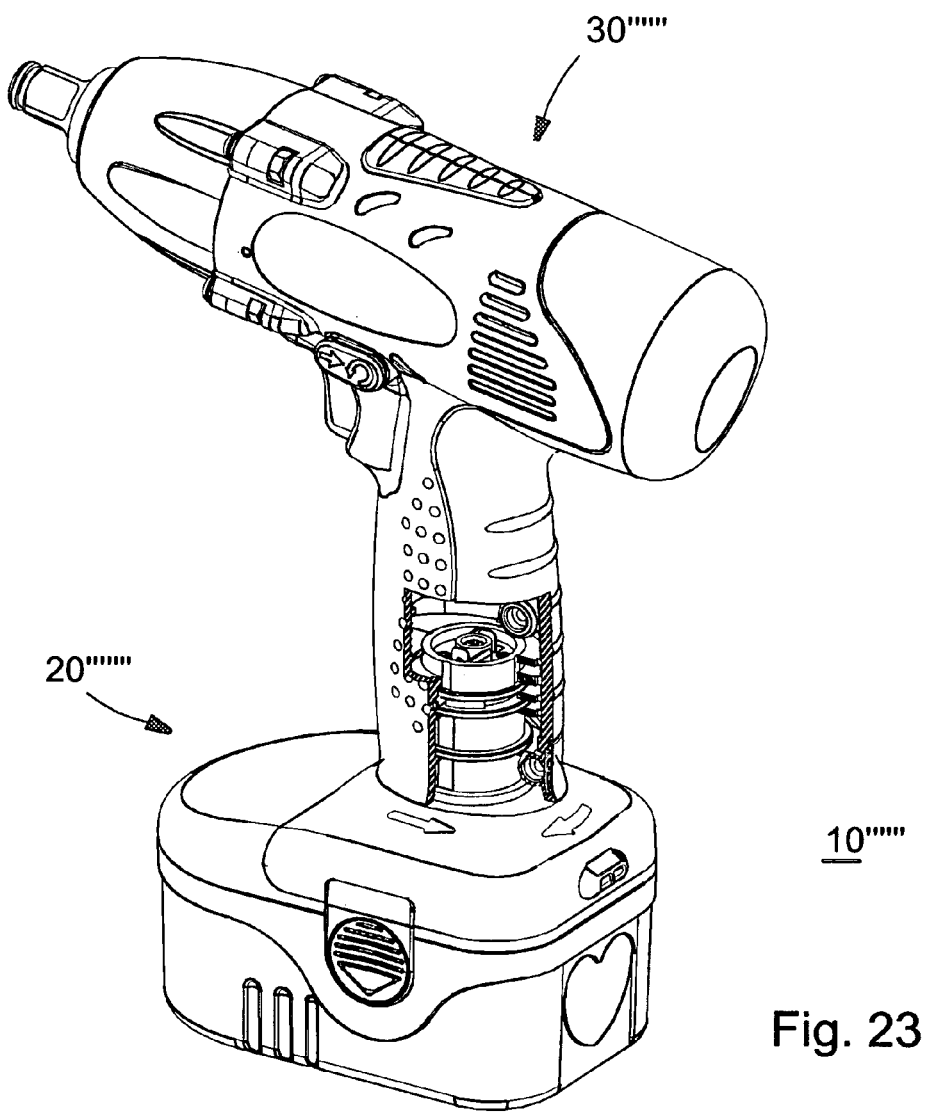
Figure 24:
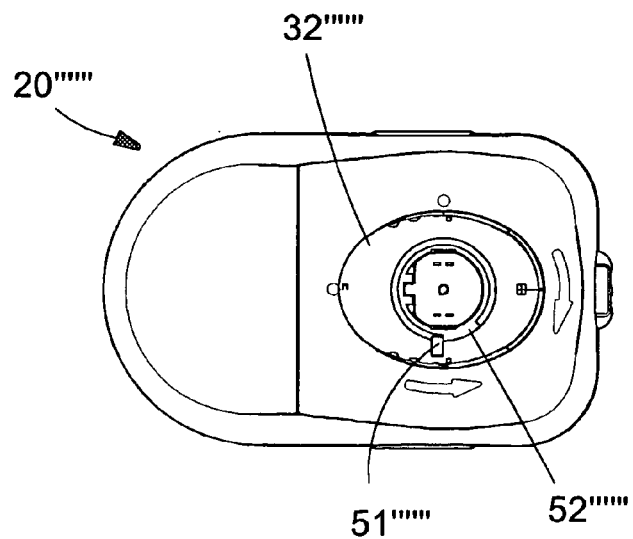
Figure 25:
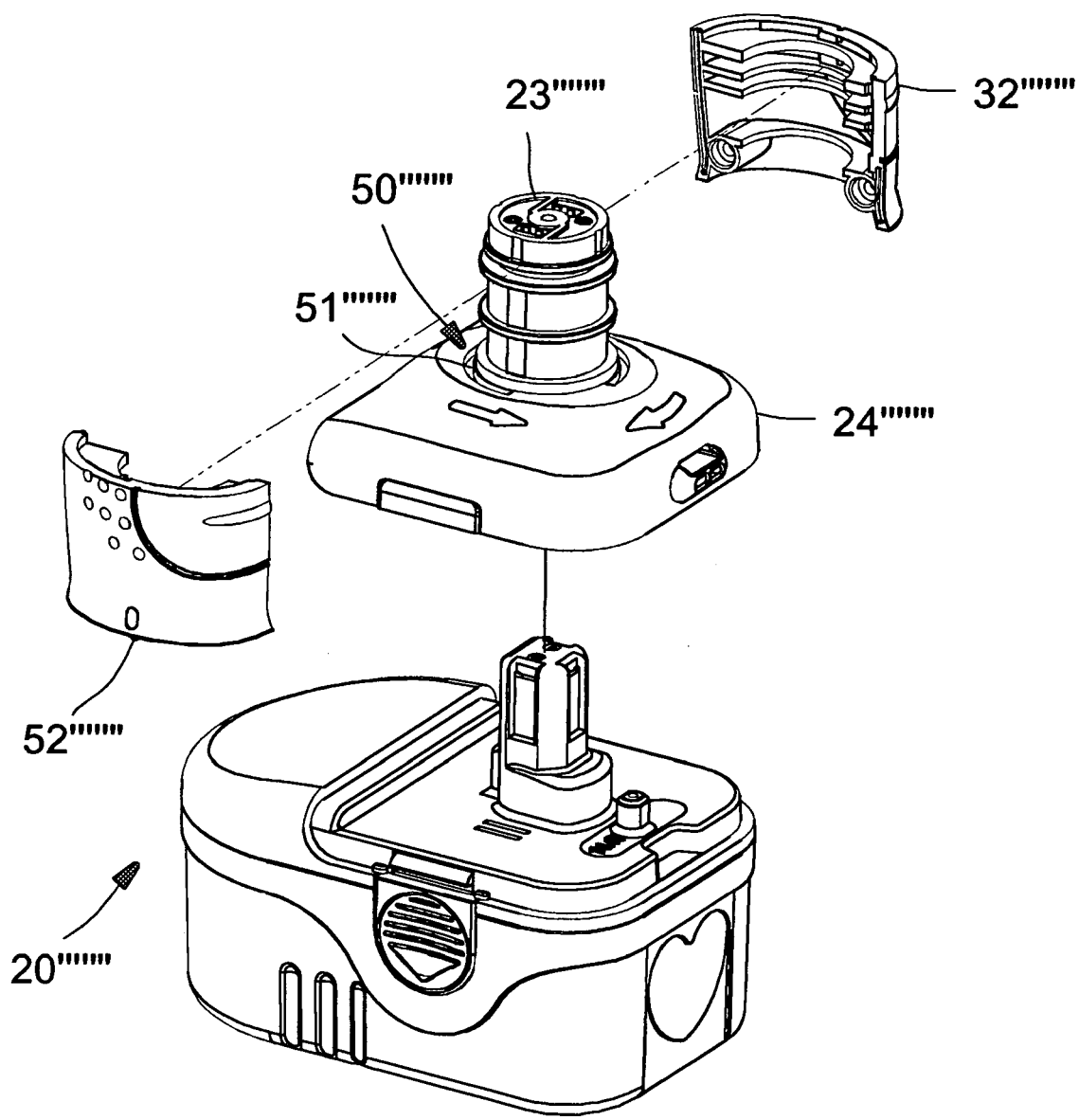
Figure 26:
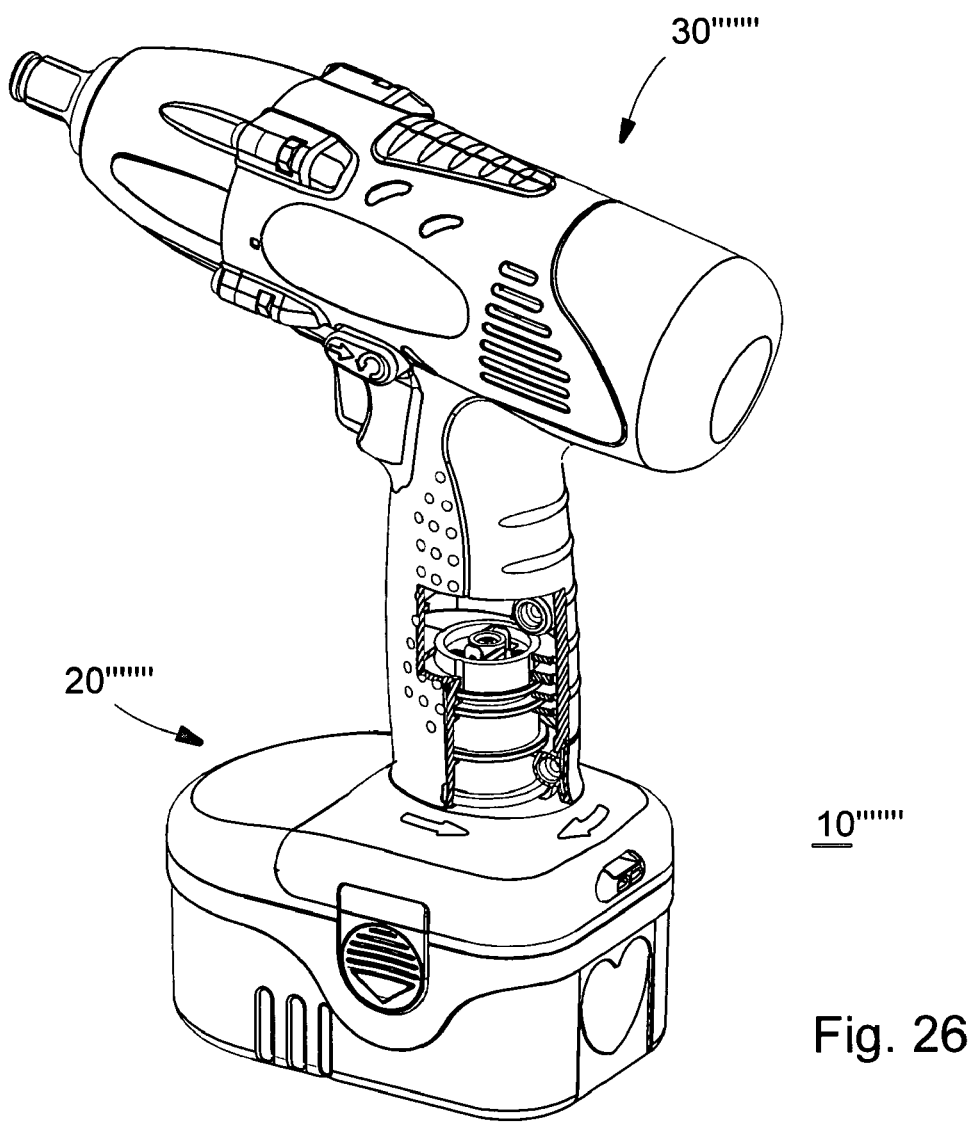
Figure 27:
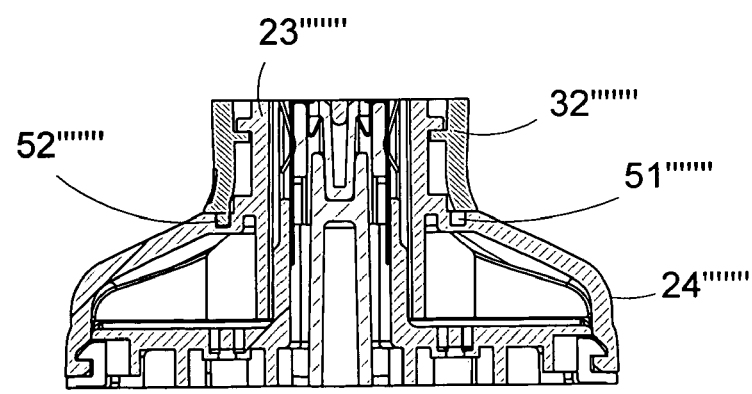

FIG. 6 is a partial cross sectional view along line 6—6 in FIG. 2;
FIG. 7 is a top view along line 6—6 in FIG. 2;
FIG. 8 is a partial cross sectional view along line 8—8 in FIG. 3;
FIG. 9 is a top view along line 8—8 in FIG. 3;
FIG. 10 is an exploded view to show a second embodiment of the present invention;
FIG. 11 is a partial cross sectional view of the battery pack of the second embodiment of the present invention;
FIG. 12 is a cross sectional view of the battery pack of the second embodiment of the present invention;
FIG. 13 is an exploded view to show a third embodiment of the present invention;
FIG. 14 is a perspective view of the third embodiment of the present invention;
FIG. 15 is an exploded view to show a fourth embodiment of the present invention;
FIG. 16 is a perspective view of the fourth embodiment of the present invention;
FIG. 17 is an exploded view to show a fifth embodiment of the present invention;
FIG. 18 is a perspective view of the fifth embodiment of the present invention;
FIG. 19 is an exploded view to show a sixth embodiment of the present invention;
FIG. 20 is a perspective view of the sixth embodiment of the present invention;
FIG. 21 is a top view of the sixth embodiment of the present invention;
FIG. 22 is an exploded view to show a seventh embodiment of the present invention;
FIG. 23 is a perspective view of the seventh embodiment of the present invention;
FIG. 24 is a top view of the seventh embodiment of the present invention;
FIG. 25 is an exploded view to show an eighth embodiment of the present invention;
FIG. 26 is a perspective view of the eighth embodiment of the present invention, and
FIG. 27 is a top view of the eighth embodiment of the present invention.

DETAILED DESCRIPTION OF THE PREFERRED EMBODIMENT

Figure 3:
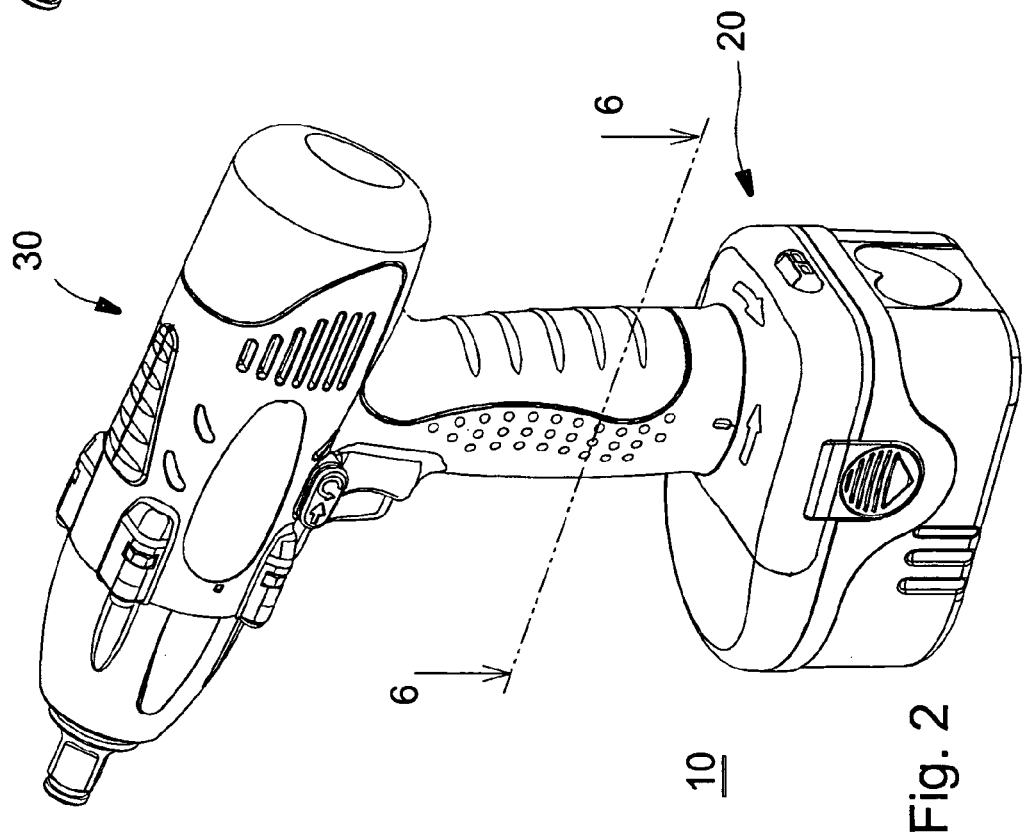
FIG. 3 shows that the battery pack of the first embodiment is positioned at the second position.
Figure 5:
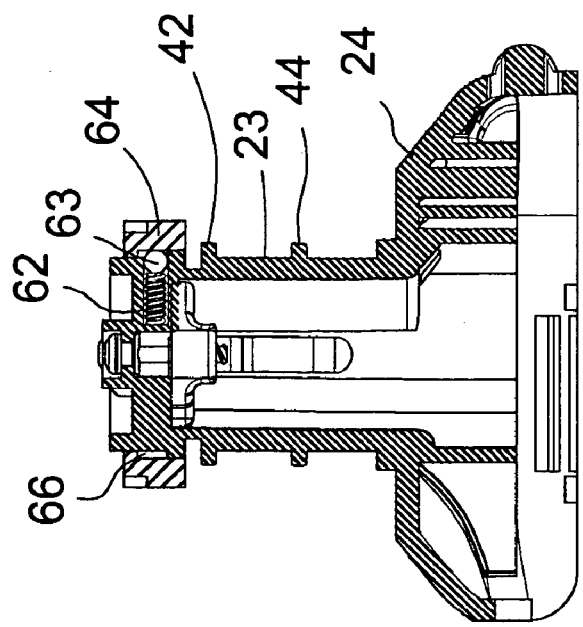
FIG. 5 shows a cross sectional view of the battery pack in FIG. 4.
Figure 4:
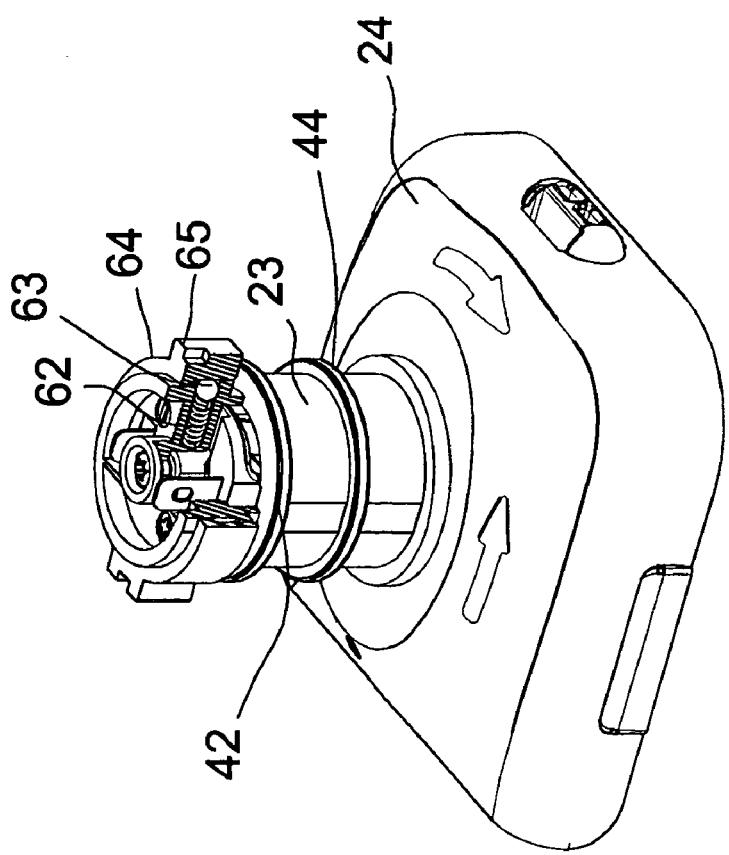
FIG. 4 shows a perspective view of the first embodiment of the battery pack.

FIGS. 1 to 9 show a connection 10 of a batter-powered tool 20 and a battery pack 20, wherein the battery-powered tool 30 of the present invention comprises a barrel 31 and a handle 32 connected to the barrel 31. The handle 32 has a space 33 defined axially therein. The battery pack 20 has a body 21 and a conductive connection portion 22 extends from a top of the battery pack 20. A hollow pivotal tube 23 is mounted to the conductive connection portion 22 and is inserted in the space 33 of the handle 32 so as to provide the tool 30 with electric power. The battery pack 20 includes a base portion 24 which extends laterally from a root portion of the pivotal tube 23 and the base portion 24 is connected on the body 21. The pivotal tube 23 can be pivoted between a first position and a second position as shown in FIGS. 2 and 3.

A limitation portion 40 for limiting a movement of the pivotal tube 23 in the handle 32 along an axial direction includes a groove 41 and a block 42 which is engaged with the groove 41. The groove 41 and the block 42 are located between an outer periphery of the pivotal tube 23 and an inner periphery of the space 33. In this embodiment, the groove 41 is an annular groove 41 and the block 42 is an annular block 42. The limitation portion 40 further includes a first flange 43 which extends the inner periphery of the space 33, and a second flange 44 which extends from the outer periphery of the pivotal tube 23. A top of the first flange 43 is in contact with an underside of the second flange 44.

An angle restriction portion 50 for restricting the body 31 to be rotated an angle less than 360 degrees between the first and second positions includes a first restriction member 51 which is connected to the outer periphery of the pivotal tube 23 and a second restriction member 52 which is located in the space 33 and in the same plane with the first restriction member 51. In this embodiment, the first restriction member 51 and the second restriction member 52 are curve and flat boards. In other words, when the battery pack 20 is in the first position, two respective first ends of the first and second restriction member 52, 53 are in contact with each other, two respective second ends of the first and second restriction member 52, 53 are in contact with each other, when the battery pack 20 is in the second position. This restricts the angle to be rotated of the battery pack 20 is less than 360 degrees. The restriction of the angle to be rotated avoids the wires to be pulled severely during changing positions of the battery pack 20.

A positioning portion 60 is located between the pivotal tube 23 and the inner periphery of the space 33 so as to position the battery pack 20 relative to the handle 32. The positioning portion 60 includes a recess 61 defined in the outer periphery of the pivotal tube 23 and a spring 63 and a protrusion 63 are received in the recess 61 so that the protrusion 63 is biased by the spring 63 and partially protrudes form the recess 61. A collar 64 is mounted to the pivotal tube 23 and two lugs 65 extend from an outer periphery thereof so as to be engaged with positioning notches 331 in the inner periphery of the space 33. A plurality of notches 66 are defined in an inner periphery of the collar 64 and the protrusion 63 is engaged with one of the notches 66 when rotating the battery pack 20 relative to the handle 32. The user is acknowledged by the "click" when the protrusion 63 is engaged with one of the notches 66.

FIGS. 10–12 show a second embodiment of the present invention wherein the recess 61' for receiving the spring 62' and the protrusion 63' can be defined in an inner periphery of the collar 64', and the notches 66' are defined in an outer periphery of the pivotal tube 23'.

FIGS. 13–14 show the third embodiment of the connection 10" wherein the collar is omitted and the notches 66" are defined in an inner periphery of the space 33".

FIGS. 15–16 show the fourth embodiment of the connection 10''' wherein the spring is omitted and the depth of the recess 61''' is less than a diameter of the protrusion 63'''.

FIGS. 17–18 show the fifth embodiment of the connection 10'''' wherein the protrusion 63'''' extends from an outer periphery of the pivotal tube 23'''' and the notches 66'''' are defined in an inner periphery of the space 33''''. The protrusion 63'''' and the notches 66'''' are made by plastic material which is flexible and deformable so as to allow the protrusion 63'''' to be engaged with one of the notches 66''''.

FIGS. 19–21 show the sixth embodiment of the connection 10''''' wherein the only difference from the fifth embodiment is that the positions of the protrusion 63''''' and the notches 66''''' are exchanged with each other.

FIGS. 22–24 show the seventh embodiment of the connection 10'''''' wherein the change is made for the angle restriction portion 50'''''', wherein the first restriction member 51 is changed from a board into a pin.

FIGS. 25–27 show the eighth embodiment of the connection 10''''''' wherein the change is made for the angle restriction portion 50''''''', wherein the first restriction member 51''''''' is a curve slot with a central angle of 270 degrees and defined in the outer periphery of the pivotal tube 23'''''''. The second restriction member 52''''''' extends from the handle 32''''''' and is inserted in the first restriction member 51'''''''.

While we have shown and described the embodiment in accordance with the present invention, it should be clear to those skilled in the art that further embodiments may be made without departing from the scope of the present invention.

What is claimed is:

1. A battery-powered tool comprising:
   a barrel and a handle which is connected to the barrel, the handle having a space defined axially therein;
   a battery pack having a body and a pivotal tube extending from a top of the battery pack, the pivotal tube inserted in the space of the handle, the pivotal tube being pivoted between a first position and a second position;
   a limitation portion for limiting a movement of the pivotal tube in the handle along an axial direction, and
   an angle restriction portion restricting the body to be rotated an angle less than 360 degrees between the first and second positions.

2. The tool as claimed in claim 1, wherein the pivotal tube is a hollow tube and the battery pack has a conductive connection portion onto which the pivotal tube is mounted.

3. The tool as claimed in claim 2, wherein the battery pack includes a base portion which extends laterally from a root portion of the pivotal tube and the base portion is connected on the body.

4. The tool as claimed in claim 1, wherein the limitation portion includes a groove and a block which is engaged with the groove, the groove and the block are located between an outer periphery of the pivotal tube and an inner periphery of the space.

5. The tool as claimed in claim 4, wherein the groove is an annular groove and the block is an annular block.

6. The tool as claimed in claim 1, wherein the limitation portion includes a first flange which extends from an inner periphery of the space, a second flange extends from an outer periphery of the pivotal tube, a top of the first flange is in contact with an underside of the second flange.

7. The tool as claimed in claim 1, wherein the angle restriction portion includes a first restriction member which is connected to an outer periphery of the pivotal tube and a second restriction member which is located in the space and in the same plane with the first restriction member.

8. The tool as claimed in claim 7, wherein the first restriction member and the second restriction member are flat boards.

9. The tool as claimed in claim 7, wherein the first restriction member is a pin.

10. The tool as claimed in claim 1, wherein the angle restriction portion includes a first restriction member which is a curve slot and defined in the battery pack, a second restriction member extends from the handle and is inserted in the first restriction member.

11. The tool as claimed in claim 1 further comprising a positioning portion which is located between the pivotal tube and an inner periphery of the space so as to position the battery pack relative to the handle, the positioning portion having a protrusion and notches, the protrusion received in one of the notches.

12. The tool as claimed in claim 11, wherein the protrusion and recesses are defined in the pivotal tube and an inner periphery of the space respectively.

13. The tool as claimed in claim 11, wherein the positioning portion includes a collar mounted to the pivotal tube and the protrusion and recesses are defined in an inner periphery of the collar and an outer periphery of the pivotal tube respectively.

14. The tool as claimed in claim 13, wherein the collar is fixedly connected to the inner periphery of the space.

15. The tool as claimed in claim 11, wherein the positioning portion includes a spring which biases the protrusion to be engaged with one of the recesses.

* * * * *